April 6, 1971     I. S. SHAH     3,574,051
RECOVERY OF BLACK LIQUOR
Filed Feb. 8, 1968
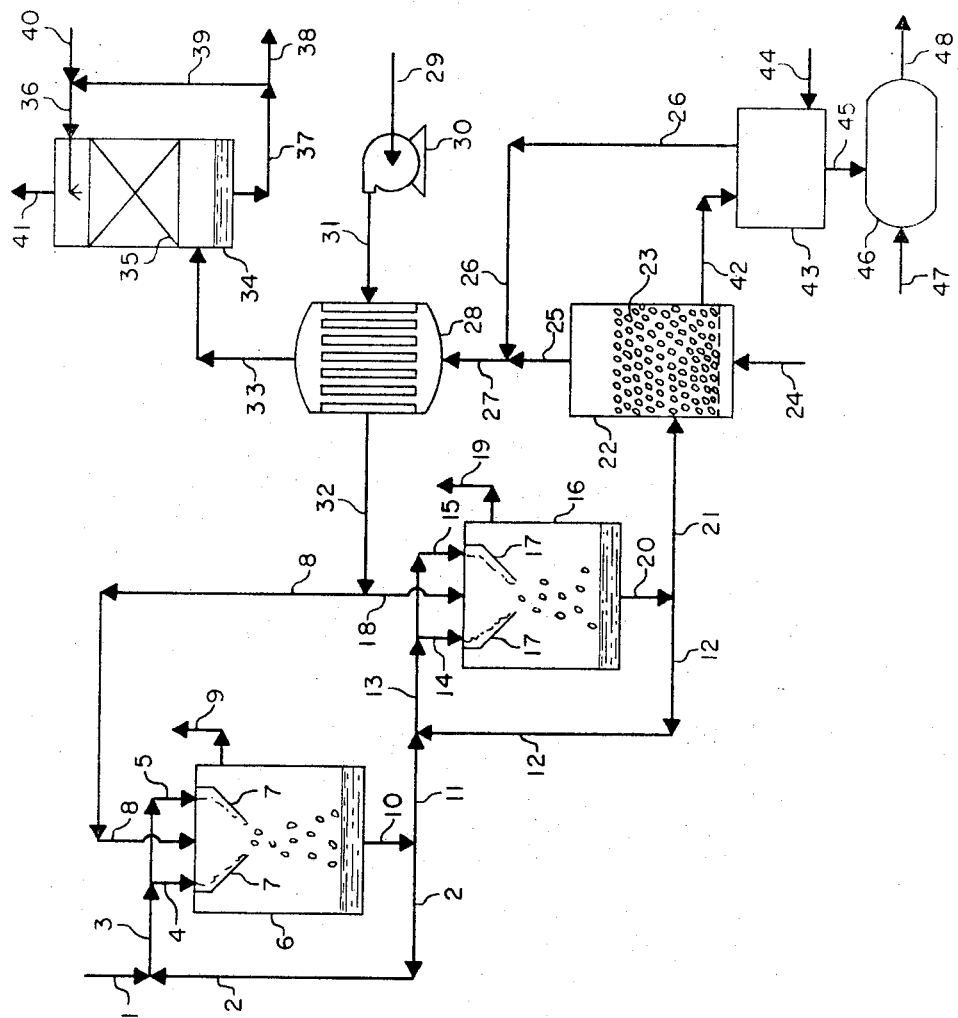
INDRAVADAN S. SHAH
*INVENTOR.*
BY *J. ?. Chu b. T.*
AGENT

United States Patent Office 3,574,051
Patented Apr. 6, 1971

3,574,051
RECOVERY OF BLACK LIQUOR
Indravadan S. Shah, Forest Hills, N.Y., assignor to Chemical Construction Corporation, New York, N.Y.
Filed Feb. 8, 1968, Ser. No. 704,054
Int. Cl. D21c 11/10, 11/12
U.S. Cl. 162—30          3 Claims

ABSTRACT OF THE DISCLOSURE

Weak black liquor derived from wood pulp processing as a result of pulp washing, is concentrated, and solid salts are produced for the preparation of green liquor which is recycled to the wood pulp process. The weak black liquor is concentrated by direct contact with hot air, and the concentrated liquor is reacted with process air at elevated temperature in a fluidized bed type of reactor, to produce solid sodium sulfate and sodium carbonate salts for recycle and a hot flue gas. The hot flue gas is passed in indirect heat exchange with ambient or initially warm air, to produce the hot air for black liquor concentration. The solid salts, consisting mostly of sodium sulfate and sodium carbonate, are reacted at elevated temperature with a reducing type gas in a chemical reactor, to produce a sodium sulfide-carbonate mixture which is dissolved in an aqueous liquid, such as water or dilute wash liquor, to produce green liquor. The hot gas stream discharged from the salts reduction step is preferably combined with the hot flue gas generated during solid salts production from concentrated black liquor, and the combined gas stream is then employed to preheat air. The process is preferably applicable to a kraft pulp process.

BACKGROUND OF THE INVENTION

Field of the invention

The invention relates to the processing of black liquor, which is produced during the digestion or processing of wood pulp, and the recovery of valuable salts from the black liquor for recycle to the wood pulp process.

Description of the prior art

The provision of a fluid bed reactor for the conversion of black liquor to solid salts is described in U.S. Patents Nos. 2,568,239; 2,755,749; 2,928,184; 3,309,262 and 3,322,492. The concept and apparatus for the direct contact of black liquor with hot flue gas derived from black liquor combustion, in order to concentrate the black liquor, is shown in U.S. Patents Nos. 2,258,467; 2,590,905; 2,980,179; 3,183,145; 3,299,942 and 3,324,632. Other disclosures relative to the evaporation of black liquor and the recovery of solids salts and chemicals from the black liquor include U.S. Patents Nos. 2,786,518; 2,840,454; 2,888,982; 3,176,756; 3,179,159 and 3,323,858.

In the existing processes, the weak black liquor at 10% to 20% solids concentration is initially concentrated in multiple effect evaporators, using steam as a heating medium. Further concentration is carried out in a direct contact evaporator, using hot flue gases from the steam-generating recovery furnace. The recovery furnace is the main source of chemical loss in the form of dust and sulfur-bearing gases, which also creates an air pollution nuisance. In addition, these gases contain carbon dioxide, which reacts with the sodium sulfide content of the black liquor in the direct contact evaporator to release hydrogen sulfide gas, which creates an odor nuisance and chemical loss. Either a scrubber or electrostatic precipitator is used for collection of dust. The condensate from the multiple effect evaporator is a source of water pollution, and the non-condensable gases are a source of air pollution.

The steam-generating recovery furnace or boiler performs two functions, in acting both as a chemical reactor for black liquor combustion and a steam boiler. The quantity of flow rate of air is generally kept at a minimum, in order to produce more steam at higher temperature and pressure, and also to maintain reducing conditions. This results in the release of a large quantity of hydrogen sulfide and other sulfur bearing gases, which causes an air pollution problem as well as a chemical loss. In addition, the temperature of the flue gas leaving the furnace is relatively low, usually about 250° C. to 300° C., which is a direct result of steam production. The flue gas discharged from the recovery furnaces of the prior art is a serious source of air pollution and chemicals loss, since both sulfur bearing gases such as hydrogen sulfide and entrained solid particles of dust containing sodium sulfate and sodium carbonate are present in the flue gas.

The direct contact evaporator can be a cyclonic, cascade or venturi type, such as shown in U.S. patent application No. 481,682 filed Aug. 23, 1965 and now issued as U.S. Patent No. 3,439,724. The black liquor at 45% to 50% solids concentration, derived from the multiple effect evaporators, is further concentrated to a level of 60% to 70% solids concentration, using hot flue gases from the recovery boiler in the direct contact evaporator. As mentioned supra, the flue gas leaving the recovery boiler contains carbon dioxide, which reacts with the sodium sulfide of the black liquor in aqueous solution to generate hydrogen sulfide gas, which results in air pollution and a chemical loss.

The multiple effect evaporator for initial concentration of the weak black liquor is usually a tubular type indirect contact evaporator. The steam generated in the recovery boiler is usually used as the initial evaporating medium. Thus, the condensate and non-condensable gases from the later evaporation stages are a source of pollution and chemical loss due to the presence of mercaptans, hydrogen sulfide, etc. The multiple effect evaporation facility is also limited to a final liquor concentration of about 50% solids, because higher concentrations result in a scaling problem and low steam economy.

The recovery boiler flue gases at 250° C.–300° C. provide enough heat for black liquor evaporation from 45%–50% solids to 60%–70% solids concentration in the liquor. In addition, the recovery boiler generates steam for multiple effect evaporation. In most instances, this steam requirement is about 25% of the total steam generated.

In summary, the present and prior art systems are objectionable because of concentration limitations on indirect type tubular evaporators, air and water pollution, higher chemical loss, and high capital costs for commercial facilities.

SUMMARY OF THE INVENTION

In the present invention, weak black liquor is processed in an improved manner, to produce green liquor for recycle to wood pulp processing and digestion. The weak black liquor is initially concentrated by direct contact with a stream of heated air, which evaporates water from the black liquor without thermal degradation or decomposition of the black liquor constituents. The resulting air stream laden with water vapor is thus suitable for direct discharge to atmosphere, without causing air pollution. The concentrated black liquor is reacted and burned with air in a fluidized bed type reactor. An excess of air is provided in the reactor, and usually at least 10% excess air above the stoichiometric requirement for total oxidation of components in the black liquor is provided, so that an oxidation environment is continuously maintained in the reactor, and all sulfur-con taining material is converted to solid sodium sulfate. As a result, the hot flue gas discharged from the reactor is substantially free of sulfur-containing constituents such as hydrogen sulfide or sulfur dioxide. After heat recovery and wet scrubbing to remove entrained solids particles, the flue gas is suitable for discharge to the atmosphere without causing air pollution. The hot flue gas is processed for heat recovery in a gas-to-gas heat exchanger, which cools the flue gas by indirect heat exchange with an air stream, which is heated and then employed as described supra to concentrate the weak black liquor in a direct contact evaporator. The residual solid salts stream discharged from the fluidized bed type reactor now consists mainly of sodium sulfate and sodium carbonate. The solid salts stream is passed to a chemical reactor and is reacted with a reducing gas stream, which usually contains carbon monoxide as the reducing component. The sodium sulfate in the solid salts is reduced to sodium sulfide, and the resulting salts mixture of sodium sulfide and sodium carbonate is dissolved in an aqueous liquid such as water or weak wash liquor, to form green liquor which is further processed for pulp digestion or other processing.

The principal advantage of the invention is that air and water pollution are substantially completely eliminated. The procedure also provides high thermal efficiency and essentially total recovery of chemicals and chemical constituents such as sulfur. In addition, another advantage is that the process requires less plant space and equipment cost is lowered, since the prior art multiple effect evaporators for the concentration of the black liquor have been obviated. The use of heated air in direct contact black liquor evaporators provides other important advantages, including oxidation of the black liquor, avoidance of the release of hydrogen sulfide, and other sulfur bearing gases, prevention of the carbonation of the black liquor, and the ability to produce highly concentrated black liquor of 70% or higher total solids content.

It is an object of the present invention to provide an improved process for the regeneration of chemicals from black liquor derived from wood pulp processing.

Another object is to prevent air and water pollution during the processing of weak black liquor to produce regenerated green liquor.

A further object is to convert concentrated black liquor to oxidized solids salts principally consisting of sodium sulfate and sodium carbonate, by burning the black liquor with air in an oxidizing environment, and thereby prevent the release of sulfur-containing components into the flue gas generated by the black liquor combustion.

An additional object is to concentrate and oxidize black liquor in an improved manner.

Still another object is to convert weak black liquor to regenerated green liquor in an improved manner.

Still a further object is to concentrate weak black liquor to a high level of solids concentration while preventing the release of hydrogen sulfide and other sulfur bearing malodorous gases and avoiding carbonation of the black liquor.

An object is to provide a process for the recovery of chemicals from weak black liquor in order to regenerate green liquor.

An object is to produce green liquor by processing weak black liquor by a process which has high thermal and chemicals recovery efficiencies, and low equipment cost and space requirement.

These and other objects and advantages of the present invention will become evident from the detailed description which follows.

DESCRIPTION OF THE DRAWING AND PREFERRED EMBODIMENTS

Referring now to the drawing, a flowsheet of a preferred embodiment of the invention is presented. Weak black liquor stream 1 is derived from the processing of wood pulp, such as a wood pulp digestion and washing procedure. Stream 1 can be unoxidized weak black liquor as derived from a pulp washing process, or can be oxidized liquor as derived from an oxidation process. Stream 1 will typically contain in the range of about 10% to 20% solids content by weight. Solids content refers to the net residue which would remain if all of the free and uncombined water is evaporated from the black liquor, without changing the chemical composition of other components. Stream 1 is combined with recycle black liquor stream 2, which is partially concentrated liquor derived in a manner to be described infra. The resulting combined black liquor stream 3 is preferably divided into stream portions 4 and 5, which are passed into first stage liquor concentrator 6 adjacent to the upper and inner surface of venturi contactor 7, which is structurally an inverted frusto-conical baffle. The contactor 7 serves to provide uniform dispersion of the downflowing liquor into the downflowing hot air stream 8, which is admitted into the top of unit 6 and flows downwards within section 7, and is thereby accelerated to a high velocity. The liquor streams 4 and 5 usually flow downwards on the upper surface of unit 7 as a thin liquid film, which is projected and dispersed into the highly accelerated hot air stream at the lower outlet of unit 7 in the form of small liquid droplets. The uniform dispersion of liquid droplets in the hot air results in a rapid attainment of gas-liquid equilibrium, with resultant vaporization of a portion of the water content of the black liquor into the air stream, which is thereby cooled from an initial temperature typically in the range of about 100° C. to 350° C., to a lower temperature typically in the range of about 50° C. to 150° C. The cooled air phase, now at a temperature in the range of about 50° C. to 150° C., and laden with water vapor, is removed from unit 6 via stream 9, which is discharged to atmosphere. Because of the usage of hot air stream 8 for direct contact evaporation of the black liquor, stream 9 is relatively free of noxious components and entrained solid particles, and may be safely discharged to atmosphere without causing air pollution. The resultant liquid phase consisting of partially concentrated black liquor, which collects in the bottom of unit 6, is withdrawn via stream 10. The partially concentrated black liquor stream 10 is divided into recycle stream 2 and stream 11, which is passed to further concentration and processing.

Stream 11 is now further concentrated in a manner similar to the concentration of stream 1 as described supra, using a second portion of hot air for evaporation of water from the liquor. Since a processing sequence is employed for concentration of stream 11 which is comparable to the procedure described supra, this sequence will only be briefly described. Partially concentrated black liquor stream 11 is combined with recycle black liquor stream 12 and the resulting combined liquor stream 13 is divided into stream portions 14 nad 15, which are passed into evaporation-concentration unit 16 above the venturi contactor 17, which is essentially an inverted frusto-conical baffle. Hot air stream 18 is centrally admitted into the top of unit 16, and gas-liquid contact is attained at the lower end of unit 17 between the downflowing liquor film and the high velocity hot air stream, with concomitant vaporization of water into the air phase and cooling of the air from an initial temperature typically in the range of about 100° C. to 350° C., to a reduced temperature typically in the range of about 50° C. to 150° C. The cooled air laden with water vapor is discharged to atmosphere via stream 19. The resulting highly concentrated black liquor stream 20, which is removed from the bottom of unit 16, is divided into recycle stream 12 and stream 21. The highly concentrated black liquor stream 21, which now typically contains in the range of about 30% to 70% solids content by weight, is passed to further processing for the recovery of solid salts and subsequent production of green liquor.

Stream 21 is now passed into oxidation reactor 22, in which the concentrated black liquor is burned in an oxidizing atmosphere, in order to convert all sulfur-containing components to sodium sulfate without the formation of hydrogen sulfide or other gaseous sulfur-containing compounds. Reactor 22 is preferably a fluid bed type of oxidizer, in which a fluid bed 23 consisting of discrete solid salt particles is maintained in turbulent or ebullient motion by the injection of process air stream 24 below the bed 23. The rising process air stream 24 serves to maintain bed 23 in suspended or fluid motion within unit 22, and produces in situ oxidation of the concentrated black liquor stream 21, with the resultant formation of additional solid salts particles consisting principally of sodium sulfate and sodium carbonate, and the generation of a hot flue gas. The bed 23 is generally maintained at an elevated temperature typically in the range of about 250° C. to 600° C. The resultant hot flue gas generated within bed 23 at this high temperature level is discharged from unit 22 via stream 25, which is preferably combined with hot residual gas stream 26 to form hot combined gas stream 27, which is generally at a temperature in the range of about 250° C. to 600° C. Stream 26 is derived from subsequent processing in a manner to be described infra.

The hot combined off-gas stream 27 is now passed into gas-to-gas heat exchanger 28, in order to heat an air stream in accordance with the present invention. The air stream 29, which will usually consist of ambient air, is passed or drawn into blower 30, which serves to force the air stream through the system, and the air stream 31 discharged from unit 30 is passed through heat exchanger 28 in indirect heat exchange with stream 27. The resulting heated air stream 32, now at a temperature typically in the range of about 100° C. to 350° C., is divided into streams 8 and 18, which are utilized in accordance with the invention as described supra.

The cooled off-gas stream 33 discharged from unit 28 is now at a temperature typically in the range of 50° C. to 200° C., and in some instances stream 33 may be directly discharged to atmosphere. In most instances, however, stream 33 will be scrubbed with an aqueous liquid solution to remove and recover entrained solid salts particles, prior to discharge to atmosphere. In this case, stream 33 is passed into scrubbing tower 34 below gas-liquid contact section 35, which may consist of a plurality of sieve trays, a bed of packing which may consist of spheres, rings or saddles, or other suitable means for gas-liquid contact. Aqueous scrubbing liquid stream 36 is dispersed into unit 34 above section 35, and flows downwards through section 35 countercurrent to the rising gas stream, thereby scrubbing entrained solids particles from the gas phase into the liquid solution. The resulting liquid solution containing entrained or dissolved solid particles is withdrawn from the bottom of unit 34 via stream 37, which is divided into drainoff stream 38 and recycle stream 39. Stream 38 may be utilized within the process as will appear infra, in order to recover the chemicals content of stream 38, and recycle stream 39 is combined with makeup aqueous liquid stream 40 to form stream 36. Stream 40 may consist of dilute black liquor similar to stream 1 water per se, wash water from the wood pulp processing sequence, or other suitable aqueous liquid solution. The scrubbed off-gas is discharged from unit 34 above section 35 via stream 41.

Returning to unit 22, a solid salts stream 42 is withdrawn from bed 23. Stream 42 consists of salts particles which principally contain sodium sulfate and sodium carbonate, and stream 42 is now processed to produce green liquor for recycle to the pulp processing sequence. Stream 42 is passed into chemical reactor 43, in which the solid salts are contacted with a reducing gas stream 44 at elevated temperature generally in the range of 250° C. to 500° C., in order to reduce sodium sulfate to sodium sulfide. Stream 44 will usually consist of carbon monoxide or a gas stream containing carbon monoxide, which may be produced by the reaction of coal or other carbonaceous material with a limited amount of air. In other instances, stream 44 may consist of natural gas, powdered coal, or a limited amount of concentrated black liquor derived from stream 21, and therefore the term "reducing gas" is meant to encompass any gaseous, liquid or solid material which is suitable for the selective reduction of sodium sulfate to sodium sulfide. Unit 43 will preferably consist of a rotary kiln or tray-type furnace, and may be externally heated. The resulting reduced solids salts stream 45 discharged from unit 43 and consisting principally of sodium sulfide and sodium carbonate is passed into dissolving tank or vessel 46, in which the solid salts are mixed with and dissolved into aqueous liquid stream 47, which may consist of water or weak wash solution. The resulting green liquor stream 48 discharged from unit 46 is now passed to a causticizer, or otherwise utilized in wood pulp processing.

Numerous alternatives within the scope of the present invention will occur to those skilled in the art, besides those alternatives and variations mentioned supra. The ranges of process variables such as temperature and black liquor concentration constitute preferred embodiments for optimum utilization of the process concepts of the invention, and the invention may be practiced outside of these ranges in suitable instances. Units 6 and 16 may alternatively consist of other types of venturi contactors, such as venturi units provided with the typical venturi configuration of converging inlet passage, throat section of restricted cross-section, and diverging outlet passage. In this case, the venturi contactor may be disposed vertically or horizontally, and the black liquor may be transversely projected into the highly accelerated hot air stream at the throat section of the venturi. Other types of contactors such as cyclonic or cascade types may alternatively be employed, instead of units 6 and 16, and one or more than two contactors may be provided in practice. In instances when only one contactor is provided, unit 16 would be omitted, all of stream 32 would be utilized via stream 8, and stream 11 would pass directly into unit 22. In instances when three or more contactors are provided in series, stream 32 will be divided into a corresponding number of portions, each of which would be passed through one of the contactors. The reactor 22 is preferably a fluid bed reactor, however a rotary kiln or other type of gas-solids contactor may be employed in suitable instances. In some cases, auxiliary heating of unit 22 may be provided by injecting a fluid hydrocarbon fuel into the lower end of unit 22 together with stream 24, in which case combustion of the fuel would take place below bed 23 and sufficient excess air would be provided via stream 24 to maintain an oxidizing atmosphere in bed 23. In other instances, the chemical reaction in bed 23 may produce excess heat, in which case a steam coil, not shown, could be disposed in unit 22, so as to produce usable process steam by passing condensate or boiler feed water into the coil.

Stream 29 is usually an ambient air stream, however in some cases stream 29 may be initially warm or hot air produced by auxiliary heat exchange. In some instances stream 32 may be further heated to provide a greater evaporation effect in units 6 and 16. In this case, a fluid hydrocarbon fuel may be burned in stream 32 in a suitable furnace or other device, not shown, and the resulting hot air stream containing combustion products would be utilized via streams 8 and 18. In other cases, stream 32 may be further heated by indirect heat exchange with other process fluids or steam.

Unit 34 may alternatively consist of a simple spray tower, in which case section 35 would be omitted. In other cases, unit 34 may be replaced by other types of wet gas scrubbers such as a venturi scrubber, or by a dry solids collector such as a baffled or cyclonic unit, a bag filter, or an electrostatic precipitator. If a dry type of gas cleaner and solids collector is employed instead of unit 34, the collected solids will be added to stream 42. Stream 38 may also be added to stream 42, however stream 38 is preferably added to stream 21. In instances when stream 38 consists of a dilute aqueous solution or slurry, stream 38 may even be added to stream 1 or 11 for concentration purposes. Finally in some cases stream 26 may be passed to other utilization such as for usage as a heating fuel gas, or for indirect heat exchange with other process streams such as stream 29. In this case, stream 27 will consist entirely of stream 25.

The invention is preferably applicable to the dilute black liquor derived from a kraft pulp process, however the invention is also applicable to other types of black liquors derived from various chemical process procedures such as digestion in other types of wood pulp processes.

An example of an industrial application of the process of the present invention will now be described.

EXAMPLE

The process was applied to a commercial kraft pulp facility which generated 1580 kg./min. of weak black liquor which averaged 17% solids content. Following is data relative to principal process streams.

| Stream No. | Flow rate, kg./min. | Solids content, percent | Temp, °C. |
|---|---|---|---|
| 1 | 1,580 | 17 | 80 |
| 8 | | | 200 |
| 9 | | | 65 |
| 18 | | | 200 |
| 19 | | | 65 |
| 21 | 771 | 35 | 85 |
| 27 | | | 700 |
| 29 | | | 20 |
| 33 | | | 120 |
| 38 | | 30 | |
| 41 | | | 65 |
| 48 | (¹) | | |

¹Averaged 341 liters/minute of green liquor at 27% sulfidity.

I claim:

1. A process for the regeneration of weak black liquor derived from the processing of wood pulp which comprises contacting a weak black liquor stream containing in the range of about 10% to 20% solids content by weight with a hot air stream, said hot air stream being at an initial temperature in the range of about 100° C. to 350° C., said weak black liquor stream being derived directly from a wood pulp process without prior concentration, whereby said weak black liquor stream is concentrated by evaporation of water and a concentrated black liquor stream containing in the range of about 30% to 70% solids content by weight is formed, discharging the resulting cooled air stream, said cooled air stream being at a temperature in the range of about 50° C. to 150° C. and containing water vapor evaporated from said black liquor, reacting said concentrated black liquor stream with a process air stream at elevated temperature in a fluidized bed reactor, whereby an oxidation reaction takes place in said reactor, and whereby a solids phase and hot flue gas are formed in said reactor, said solids phase comprising a mixture of sodium sulfate and sodium carbonate, removing said solids phase from said reactor, contacting said solids phase with a reducing gas stream at elevated temperature, whereby sodium sulfate is reduced to sodium sulfide and a hot residual gas stream is formed, dissolving the resulting solids phase comprising a mixture of sodium sulfide and sodium carbonate in an aqueous liquid to form green liquor, recycling said green liquor to the processing of wood pulp, combining said hot residual gas stream with said hot flue gas to form a combined hot gas stream at a temperature in the range of about 250° C. to 600° C., cooling the resulting combined hot gas stream by indirect heat exchange with an air stream, whereby said air stream is heated, discharging the resulting cooled combined gas stream, and passing the resulting heated air stream to said contact with weak black liquor as said hot air stream.

2. The process of claim 1, in which said resulting cooled combined gas stream is scrubbed with an aqueous liquid to remove entrained solids particles, and the scrubbed combined gas stream is discharged to atmosphere.

3. The process of claim 2, in which said aqueous scrubbing liquid is weak black liquor, and at least a portion of the resulting liquor containing solids particles derived from said scrubbing of the combined gas stream is passed to said reactor.

References Cited
UNITED STATES PATENTS

| | | | |
|---|---|---|---|
| 2,936,215 | 5/1960 | Hochmuth | 23—48 |
| 3,047,362 | 7/1962 | Smith | 23—48 |
| 3,309,262 | 3/1967 | Copeland et al. | 162—30 |
| 3,322,492 | 5/1967 | Flood | 162—30 |

S. LEON BASHORE, Primary Examiner

T. G. SCAVONE, Assistant Examiner

U.S. Cl. X.R.

23—48; 159—47; 162—36